(12) United States Patent
Gammon

(10) Patent No.: US 7,814,674 B2
(45) Date of Patent: Oct. 19, 2010

(54) WEAR GAUGE

(75) Inventor: James H. Gammon, Manasquan, NJ (US)

(73) Assignee: Gammon Technical Products, Inc., Manasquan, NJ (US)

( * ) Notice: Subject to any disclaimer, the term of this patent is extended or adjusted under 35 U.S.C. 154(b) by 131 days.

(21) Appl. No.: 12/346,944

(22) Filed: Dec. 31, 2008

(65) Prior Publication Data

US 2009/0172963 A1 Jul. 9, 2009

Related U.S. Application Data

(60) Provisional application No. 61/018,986, filed on Jan. 4, 2008.

(51) Int. Cl.
*G01B 5/28* (2006.01)

(52) U.S. Cl. .......................................... 33/560; 33/600

(58) Field of Classification Search ................ 33/555.1, 33/560, 600, 783, 836
See application file for complete search history.

(56) References Cited

U.S. PATENT DOCUMENTS

| | | | | |
|---|---|---|---|---|
| 2,496,212 A * | 1/1950 | Holt | ........................... | 33/555.1 |
| 3,872,602 A | 3/1975 | Kennedy et al. | | |
| 5,711,083 A * | 1/1998 | Bidwell | ..................... | 33/555.1 |
| 6,330,753 B1 | 12/2001 | Li | | |
| 2001/0029677 A1* | 10/2001 | Bidwell | ..................... | 33/555.1 |

OTHER PUBLICATIONS

Argo-Tech Catalog (Carter Ground Fueling Division) showing 61657-2 Aircraft Adapter Wear Gauge.

* cited by examiner

*Primary Examiner*—G. Bradley Bennett
(74) *Attorney, Agent, or Firm*—Fraser Clemens Martin & Miller LLC; Donald R. Fraser

(57) ABSTRACT

A gauge for measuring the wear of selected cooperating surfaces of an adapter is disclosed. The gauge includes a plurality of rollers adapted to contact the selected cooperating surfaces of the adapter. A trigger mechanism is provided to cooperate with the rollers to indicate if the adapter is out of tolerance in respect of given dimensional targets.

20 Claims, 3 Drawing Sheets

WEAR GAUGE

CROSS-REFERENCE TO RELATED APPLICATION

This application claims the benefit of U.S. Provisional Patent Application Ser. No. 61/018,986 filed on Jan. 4, 2008.

FIELD OF THE INVENTION

The invention relates to a wear gauge, and more specifically to a gauge for checking the compliance of dimensions of selected surfaces of a fluid transfer system.

BACKGROUND OF THE INVENTION

The distribution of fluid products such as fuel for internal combustion engines, for example, typically involves the movement of the fluid from a central depot or a refinery to distribution centers, end users, and retail outlets, for example. One method of distribution of the fluid products involves the transportation of the fluid in tanks from one location to another location. The tanks typically include rail tanker cars, over the road trailer tankers, and airport hydrant refueling tanker trucks, for example.

When the delivery tank arrives at the location where the fluid is being delivered, the fluid must be transferred from the delivery tank to a storage tank. The delivery tank is typically equipped with an inlet valve that can be opened to provide a flow path for the fluid out of the delivery tank. An adapter is typically attached to the inlet valve. The adapter is a male coupling member adapted to be received by and form a substantially fluid tight coupling with a female coupling member. The female coupling member is typically attached to one end of a hose that provides a flow path for the fluid into the storage tank.

The adapters are manufactured to an established dimensional standard to facilitate the compatibility of the adapters with the female coupling member. All female coupling members are manufactured to form a fluid tight seal with the adapters. The adapter, illustrated in FIG. 1, is provided with four critical surfaces involved in establishing a fluid tight coupling seal with the female coupling member. The critical surfaces include a primary sealing surface 1, a clamping surface 2, an outside diameter or a centering surface 3, and a top or clamping reference surface 4. Over time the critical surfaces of the adapter wear as the adaptor is received by and removed from the female coupling member. The wear of the critical surfaces eventually causes significant dimensional changes thereto which prevents the adapter from forming the necessary fluid tight coupling seal with the female coupling member.

Presently, no efficient apparatus or method is available to measure the amount of wear in the critical sealing surfaces of the adapters. The adapters will typically remain in use until the amount of fluid leaking between the adapter and the female coupling member becomes intolerable to an operator, or until there is a catastrophic failure of the connection between the adapter and the female coupling member which can result in a substantial spill of fluid. Fluid leaks and spills can pose a safety hazard particularly when the fluid is flammable, caustic, or detrimental to the environment, for example. Additionally, the catastrophic failure of the connection typically causes a costly delay of the delivery of the fluid.

It would be desirable to have a gauge for quickly measuring the wear of the critical surfaces of an adapter to determine when the adapter should be replaced.

SUMMARY OF THE INVENTION

Compatible and attuned with the present invention, a gauge for quickly measuring the wear of the critical surfaces of an adapter to determine when the adapter should be replaced, has surprisingly been discovered.

The above objective, as well as others, may be achieved by a gauge for measuring the wear of selected cooperating surfaces of an adapter comprising a main body having a planar surface; a first roller depending from the planar surface of the main body adapted to contact an outer peripheral surface of the adapter to be measured; a second roller attached to the main body and extending beyond the planar surface adapted to contact an end surface of the adapter to be measured; a third roller slidably attached to the main body adapted to contact a surface of the adapter to be measured; and a trigger mechanism attached to the main body adapted to cooperate with the third roller to indicate a tolerance condition in the adapter.

The above objective may also be achieved by a gauge for measuring the wear of selected cooperating surfaces of an adapter comprising a main body having a planar surface; a first roller depending from the planar surface of the main body adapted to contact an outer peripheral surface of the adapter to be measured; a second roller attached to the main body and extending beyond the planar surface adapted to contact an end surface of the adapter to be measured; a third roller slidably attached to the main body adapted to contact a surface of the adapter to be measured; a tension mechanism having one end attached to the main body and an opposite end attached to an arm including the third roller; a trigger mechanism attached to the main body adapted to cooperate with the third roller to indicate a tolerance condition in the adapter; and a gauge block removably received between the first roller, the second roller, and the third roller.

The above objective may also be achieved by a method A method of calculating total accumulated wear of selected surfaces of an adapter comprising the steps of providing a gauge including; a main body having a planar surface; a first roller depending from the planar surface of the main body adapted to contact an outer peripheral surface of the adapter to be measured; a second roller attached to the main body and extending beyond the planar surface adapted to contact an end surface of the adapter to be measured; a third roller slidably attached to the main body adapted to contact a surface of the adapter to be measured; and a trigger mechanism attached to the main body adapted to cooperate with the third roller to indicate a tolerance condition in the adapter; providing a gauge block removably received between the rollers to position the third roller in a reference position; determining a reference distance of the third roller in the reference position in respect of a fixed position on the gauge while the gauge is attached to the gauge block; determining a minimal distance of the third roller in respect of the fixed position on the gauge while the gauge is attached to the adapter to be measured; and calculating the difference between the reference distance and the minimal distance to determine the total accumulated wear of the selected surfaces of the adapter.

BRIEF DESCRIPTION OF THE DRAWINGS

The above, as well as other objects and advantages of the invention, will become readily apparent to those skilled in the art from the following detailed description of an embodiment of the invention when considered in the light of the accompanying figures, in which.

DETAILED DESCRIPTION OF AN EMBODIMENT OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and the order of the steps is not regarded as necessary or critical.

Figure 2:
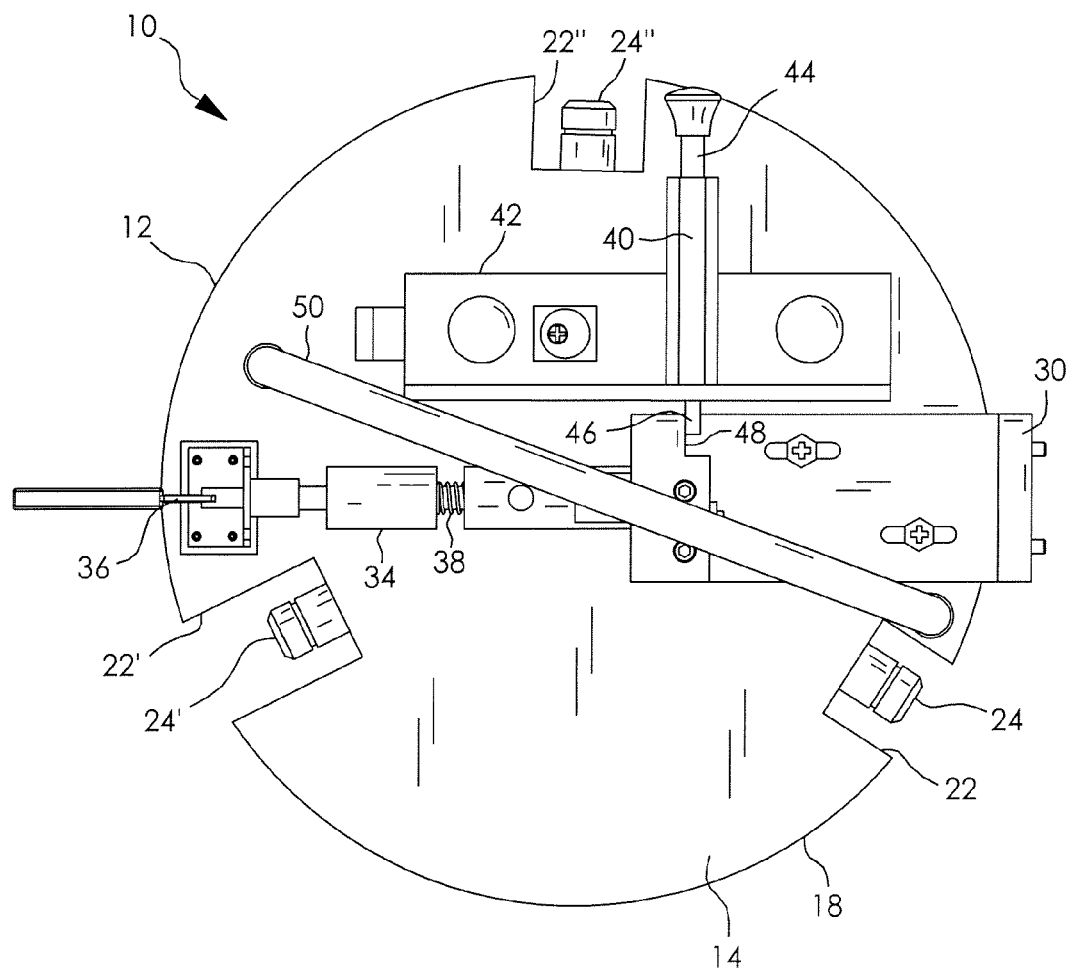
FIG. 2 is a top plan view of a gauge for checking the critical surfaces of the adapter for compliance to selected dimensional standards.
Figure 3:
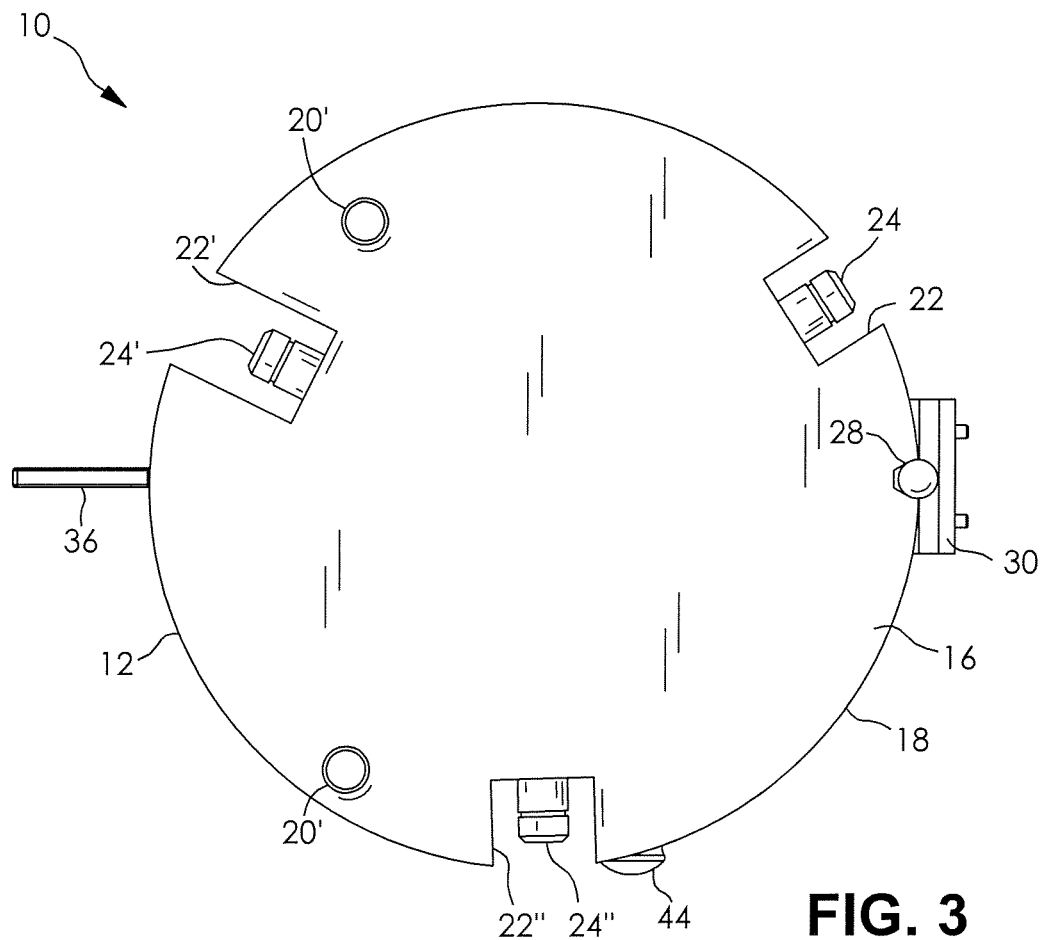
FIG. 3 is a bottom plan view of the gauge illustrated in FIG. 2.
Figure 4:
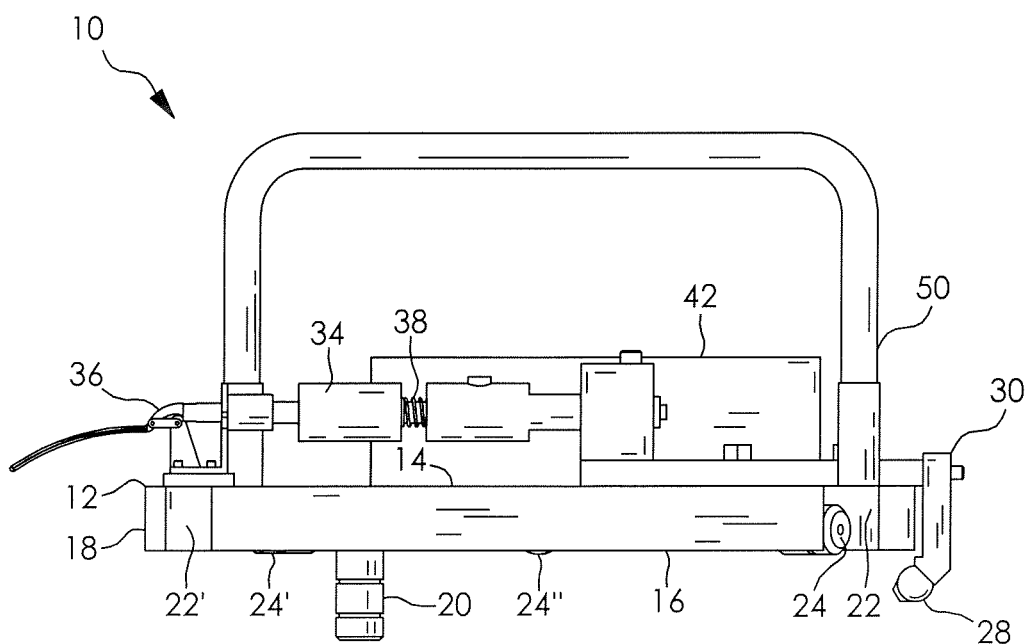
FIG. 4 is a side elevational view of the gauge illustrated in FIG. 2.

Referring to FIGS. 2-4 there is illustrated a gauge, generally indicated by reference numeral 10, for checking the dimensional compliance of selected surfaces of an adapter to selected dimensional targets and tolerances. Typical adapters are commercially available under the commercial designation of API-1004 and API/IP 1584 adapters.

The gauge 10 includes a main body 12 having a substantially planar upper surface 14 and a spaced apart a substantially planar lower surface 16 with an integral circumferentially extending sidewall 18 therebetween. A pair of rollers 20, 20' depend from the lower surface 16. The rollers 20, 20' rotate about axes that extend normally or at right angles in respect of the lower surface 16 and are adapted to contact the centering surface 3 of the adapter illustrated in FIG. 1. The rollers 20, 20' facilitate the positioning of the gauge 10 on the adapter and the rotating of the gauge 10 in respect of the adapter. It should be understood that more than two rollers can be provided to facilitate the positioning of the gauge 10 on the adapter and the rotating of the gauge 10 in respect of the adapter.

A plurality of radially outwardly opening slots 22, 22', 22" are formed in the main body 12 at selected locations around the sidewall 18. Rollers 24, 24', 24" are disposed within the slots 22, 22', 22", respectively. The rollers 24, 24', 24" rotate about axes that extend radially outwardly from the center of the main body 12 and have outer surfaces extending beyond the lower surface 16 of the gauge 10, as shown in FIG. 4. The rollers 24, 24', 24" are adapted to contact the top or clamping reference surface 4 of the adapter illustrated in FIG. 1. The rollers 24, 24', 24" facilitate the positioning of the gauge 10 on the adapter and the rotating of the gauge in respect of the adapter. It should be understood that the number of slots and associated rollers can be varied.

Figure 1:
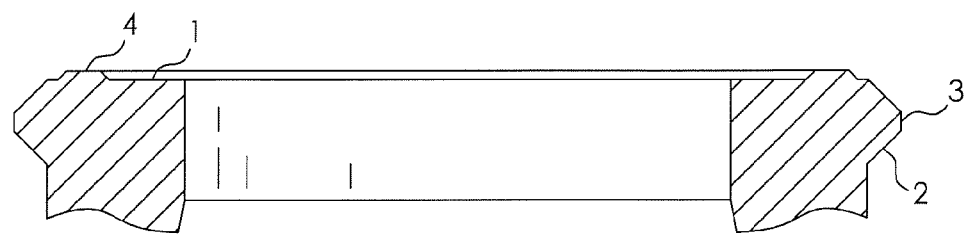
FIG. 1 is a fragmentary cross-sectional elevational view of the critical surfaces of an adapter.

A ball roller 28 is provided to contact the clamping surface 2 of the adapter illustrated in FIG. 1. The ball roller 28 is disposed at the end of an arm 30. The arm 30 is slidably attached to the upper surface 14 of the gauge 10. The arm 30 extends outwardly of the sidewall 18 and positions the ball roller 28 below the lower surface 16 of the gauge 10. It should be understood that a roller other than a ball roller can be employed to contact the clamping surface 2.

A tension mechanism 34 is provided having one end fixedly attached to the upper surface 14 of the gauge 10 and an opposite end attached to the arm 30. The mechanism 34 includes a cam lever 36 adapted to move the arm 32 between an open position and a closed or testing position. The mechanism 34 includes a spring 38 adapted to bias the arm 30 and the attached ball roller 28 inwardly toward the center of the gauge 10 to maintain the ball roller 28 in contact with the clamping surface 2 of the adapter as the gauge 10 is rotated in respect of the adapter.

As clearly illustrated in FIG. 2, a trigger mechanism 40 is slidably disposed on the upper surface 14 of the gauge 10 adjacent the arm 30. The trigger mechanism 40 includes a base 42 and a spring actuated pin 44 attached thereto. The base 42 can be slideably positioned and secured at selected locations along the arm 30. The spring pin 44 is biased to cause an end 46 of the spring pin 44 to contact a side of the arm 30 adjacent a recess 48 formed therein. The end 46 of the spring pin 44 is adapted to be received by the recess 48 when the arm 32 slides to a position where the pin 44 is in horizontal alignment with the recess 48. The end 46 of the pin 44 can be formed to have a stepped configuration (not shown) having a first diameter and a second larger diameter with a shoulder transitioning from the first diameter to the second diameter. The stepped configuration will permit the end 46 of the pin 44 to be first partially received in the recess 48 and then fully received in the recess 48 upon a further movement of the arm 30.

A handle 50 is disposed on the upper surface 14 of the main body 12 of the gauge 10. The handle 50 facilitates carrying the gauge, attaching the gauge 10 to an adapter, and rotating the gauge 10 in respect of the adapter when attached thereto.

Figure 5:
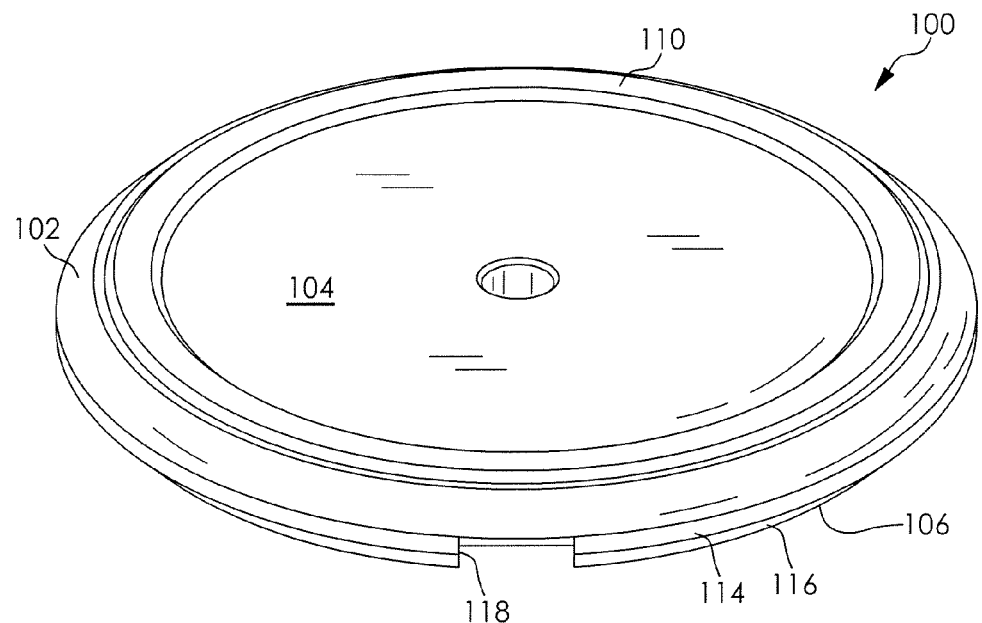
FIG. 5 is perspective view of a gauge block adapted to be removeably received by the gauge illustrated in FIGS. 2-4.
Figure 6:
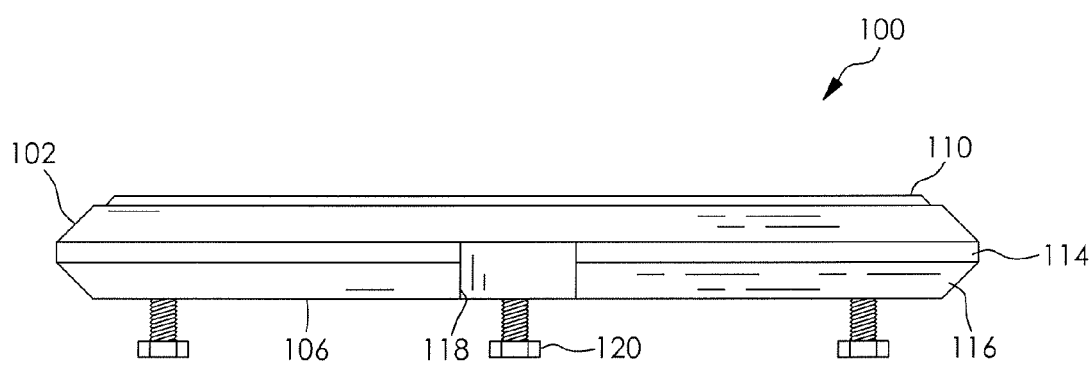
FIG. 6 is a side elevational view of the gauge block illustrated in FIG. 5.

Referring now to FIGS. 5 and 6 there is illustrated a gauge block, generally indicated by reference numeral 100. The gauge block 100 is adapted to set the gauge 10 for measuring a selected adapter. The gauge block 100 may be manufactured to replicate the selected critical surfaces of the API-1004 and the API/IP 1584 adapter. The gauge block 100 includes a body 102 having one surface 104 and a spaced apart second surface 106. The one surface 104 includes a clamping reference surface 110 elevated in respect of the one surface 104 and adjacent the outer peripheral edge of the one surface 104. The outer peripheral side of the body 102 includes a centering surface 114 and a clamping surface 116. The gauge block surfaces 110, 114, 116 correspond to the surfaces 4, 3, 2, respectively, of the adapter illustrated in FIG. 1. A notch 118 is formed in the outer peripheral side of the gauge block 100. The notch 118 is a simulated maximum allowable level of wear in the adapter, wherein a depth of the notch 118 represents the maximum allowable combined wear in the surfaces 4, 3, 2 of the adapter.

The gauge block 100 can include a colored coating such as paint or anodize, for example. The colored coating provides a visual indicator of wear on the surfaces 110, 114, and 116 of the gauge block 100. A thickness of the colored coating is such that the gauge block 100 is out of calibration when the colored coating is worn through in surfaces 110, 114, or 116.

Legs 120 are disposed on the second surface 106 of the gauge block 100. The legs 120 place the gauge block in an elevated position in respect of a supporting surface such as a table or work bench, for example. The legs 120 facilitate attaching the gauge 10 to the gauge block 100 and rotating the gauge 10 in respect of the gauge block 100.

API-1004 and API/IP 1584 adapters typically are available in three inch and four inch diameters. It should be understood that the gauge 10 and the gauge block 100 can be appropriately sized to measure either a three inch diameter or a four inch diameter adapter. Additionally, the gauge 10 and the gauge block 100 can be sized to measure other sizes of API-1004 and API/IP 1584 adapters that are now in use or that may be later developed.

In use, the cam lever 36 of the tension mechanism 34 is placed in the open position and the gauge block 100 is positioned between the respective rollers 20, 20'; 24, 24', 24'''; and 28 with the one surface 104 of the gauge block 100 facing the lower surface 16 of the gauge 10. The cam lever 36 of the tension mechanism 34 is then moved to the closed or testing position which causes the arm 30 to move inwardly toward the center of the gauge 10 placing the ball roller 28 in contact with the clamping surface 116 of the gauge block 100. The gauge block 100 is now secured within the gauge 10 placing the clamp reference surface 110 in contact with the rollers 24, 24' 24''; the centering surface 114 in contact with the rollers 20, 20'; and the clamping surface 116 in contact with the ball roller 28. After the gauge block 100 is secured, the gauge block 100 is rotated in respect of the gauge 10. The spring 38 of the tension member 34 maintains the ball roller 28 in contact with the clamping surface 116 as the gauge block 100 is rotated in respect of the gauge 10.

The gauge block 100 is rotated until the ball roller 28 is received by the notch 118 in the gauge block 100. The tension mechanism 34 causes the arm 30 to slide inwardly toward the center of the gauge 10 placing the roller ball 28 in contact with the surface of the notch 118. The base 42 of the trigger mechanism 40 is slideably adjusted and secured at a location along the arm 30 to allow the end 46 of the spring pin 44 to be received in the recess 48 of the arm 30. The depth of the notch 118 represents the combined maximum allowable wear in the surfaces 2, 3, 4 of the adapter. The trigger mechanism 40 is now set to indicate the tolerance condition in an adapter.

The cam lever 36 of the tension mechanism 34 is returned to the open position; the end 46 of the spring pin 44 is retracted from the recess 48; and the gauge block 100 is removed from the gauge 10. The gauge 10 is then attached to the adapter in the same manner as it is attached to the gauge block 100. The gauge 10 is then rotated in respect of the adapter. Should the end 46 of the spring pin 44 be received by the recess 48 in the arm 30, this would indicate that the combined wear of the surfaces 2, 3, 4 of the adapter exceeded an acceptable level. When the gauge 10 indicates an adaptor is out of tolerance, the adapter is replaced to prevent fluid leaks in and catastrophic failures of the joint formed between the adapter and the associated female coupling member. Additionally, if the end 46 of the spring pin 44 is provided with the stepped configuration, when the spring pin 44 is partially received within the recess 48, the user of the gauge 10 is alerted that the combined wear of the surfaces 2, 3, 4 are approaching the out of tolerance condition and, if so desired, more frequent checking of the adaptor can be scheduled.

The gauge 10 may also be employed to measure a total cumulative wear of the critical surfaces 2, 3, 4 of the adapter. The total cumulative wear is typically referred to as the differential side travel of the adapter. When the gauge block 100 is attached to the gauge 10 with the ball roller 28 positioned against the clamping surface 116, the position of the arm 30 is in a reference position. The reference position of the arm 30 is measured in respect of a fixed point on the gauge 10 such as the point where the tension mechanism 34 is fixedly attached to the upper surface of the gauge 10, for example. The gauge 10 is then attached to an adapter and rotated in respect thereto. The arm 30 will move inwardly to indicate any wear in the corresponding critical surfaces 2, 3, 4 of the adapter. The most inward position of the arm 30 while attached to and rotated in respect of the adapter represents a maximum wear location on the adapter. The most inward position of the arm 30 is measured in respect of the fixed point providing a most inward dimension. The difference between the reference position dimension and the most inward dimension is the differential side travel which represents the maximum combined wear in the respective critical surface 2, 3, 4 of the adaptor.

The gauge 10 and gauge block 100 described herein provide an economical system and method of measuring the dimensional compliance of an API-1004 and an API/IP 1584 adapter to a selected target and allowable tolerance. By employing the gauge 10, gauge block 100, and the methods described herein, API-1004 and API/IP 1584 adapters can be regularly checked for compliance with dimensional targets and tolerances to prevent fluid leaks and catastrophic failures from occurring between the adaptors and the associated female coupling members attached thereto. Additionally, by preventing fluid leaks and catastrophic failures, incidents of workers being exposed to the fluid; environmental damage caused by spills of fluid; and loss of salable fluid can be minimized.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A gauge for measuring the wear of selected cooperating surfaces of an adapter comprising:
    a main body having a planar surface;
    a first roller depending from the planar surface of the main body adapted to contact an outer peripheral surface of the adapter to be measured;
    a second roller attached to the main body and extending beyond the planar surface adapted to contact an end surface of the adapter to be measured;
    a third roller slideably attached to the main body adapted to contact a surface of the adapter to be measured; and
    a trigger mechanism attached to the main body adapted to cooperate with the third roller to indicate a tolerance condition in the adapter.

2. The gauge according to claim 1, including a slot formed in the main body to receive the second roller.

3. The gauge according to claim 1, including a tension mechanism having one end attached to the main body and an opposite end attached to an arm including the third roller.

4. The gauge according to claim 3, wherein the tension mechanism includes a spring to bias the third roller inwardly toward a center of the main body.

5. The gauge according to claim 3, wherein the tension mechanism includes a cam lever to move the third roller between an open position and a closed position.

6. The gauge according to claim 3, wherein the trigger mechanism is slideably attached to the main body.

7. The gauge according to claim 6, wherein the trigger mechanism includes a spring actuated pin attached thereto having an end in selected contact with the arm.

8. The gauge according to claim 7, wherein the arm includes a recess formed in a surface thereof to receive the end of the spring actuated pin.

9. The gauge according to claim 1, including a gauge block removably received between the first roller, the second roller, and the third roller.

10. The gauge according to claim 9, wherein the gauge block includes:
    a body having one surface and a spaced apart second surface, and a peripheral surface therebetween;
    a clamping reference surface formed on and elevated in respect of the one surface;

a clamping surface formed between the peripheral surface and the second surface, wherein when the gauge block is received between the rollers of the gauge, the first roller contacts the peripheral surface, the second roller contacts the clamping reference surface, and the third roller contacts the clamping surface.

11. The gauge according to claim 10, wherein a notch is formed in the clamping surface to receive the third roller.

12. A gauge for measuring the wear of selected cooperating surfaces of an adapter comprising:
- a main body having a planar surface;
- a first roller depending from the planar surface of the main body adapted to contact an outer peripheral surface of the adapter to be measured;
- a second roller attached to the main body and extending beyond the planar surface adapted to contact an end surface of the adapter to be measured;
- a third roller slidably attached to the main body adapted to contact a surface of the adapter to be measured;
- a tension mechanism having one end attached to the main body and an opposite end attached to an arm including the third roller;
- a trigger mechanism attached to the main body adapted to cooperate with the third roller to indicate a tolerance condition in the adapter; and
- a gauge block removably received between the first roller, the second roller, and the third roller.

13. The gauge according to claim 12, wherein the tension mechanism includes a spring to bias the third roller inwardly toward a center of the main body.

14. The gauge according to claim 12, wherein the tension mechanism includes a cam lever to move the third roller between an open position and a closed position.

15. The gauge according to claim 14, wherein the trigger mechanism is slideably attached to the main body.

16. The gauge according to claim 14, wherein the trigger mechanism includes a spring actuated pin attached thereto having an end.

17. The gauge according to claim 12, wherein the arm includes a recess formed therein to receive the end of the spring actuated pin.

18. The gauge according to claim 14, wherein the gauge block includes:
- a body having one surface and a spaced apart second surface, and a peripheral surface therebetween;
- a clamping reference surface formed on and elevated in respect of the one surface;
- a clamping surface formed between the peripheral surface and the second surface, wherein when the gauge block is received between the rollers the first roller contacts the peripheral surface, the second roller contacts the clamping reference surface, and the third roller contacts the clamping surface.

19. The gauge according to claim 18, wherein a notch is formed in the clamping surface to receive the roller of the arm.

20. A method of calculating total accumulated wear of selected surfaces of an adapter comprising the steps of:
- providing a gauge including; a main body having a planar surface; a first roller depending from the planar surface of the main body adapted to contact an outer peripheral surface of the adapter to be measured; a second roller attached to the main body and extending beyond the planar surface adapted to contact an end surface of the adapter to be measured; a third roller slidably attached to the main body adapted to contact a surface of the adapter to be measured; and a trigger mechanism attached to the main body adapted to cooperate with the third roller to indicate a tolerance condition in the adapter;
- providing a gauge block removably received between the rollers to position the third roller in a reference position;
- determining a reference distance of the third roller in the reference position in respect of a fixed position on the gauge while the gauge is attached to the gauge block;
- determining a minimal distance of the third roller in respect of the fixed position on the gauge while the gauge is attached to the adapter to be measured; and
- calculating the difference between the reference distance and the minimal distance to determine the total accumulated wear of the selected surfaces of the adapter.

* * * * *